(12) United States Patent
Elomari et al.

(10) Patent No.: US 9,267,091 B2
(45) Date of Patent: Feb. 23, 2016

(54) TUNING AN OLIGOMERIZING STEP THAT USES AN ACIDIC IONIC LIQUID CATALYST TO PRODUCE A BASE OIL WITH SELECTED PROPERTIES

(75) Inventors: Saleh Ali Elomari, San Francisco, CA (US); Stephen Joseph Miller, San Francisco, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 789 days.

(21) Appl. No.: 13/422,432

(22) Filed: Mar. 16, 2012

(65) Prior Publication Data

US 2012/0172644 A1 Jul. 5, 2012

Related U.S. Application Data

(63) Continuation-in-part of application No. 12/538,746, filed on Aug. 10, 2009, now Pat. No. 8,178,739, and a continuation-in-part of application No. 12/538,738, filed on Aug. 10, 2009, now Pat. No. 8,124,821, and a continuation-in-part of application No. 12/538,752, filed on Aug. 10, 2009, now Pat. No. 8,101,809.

(51) Int. Cl.

| C07C 2/08 | (2006.01) |
| C07C 2/58 | (2006.01) |
| C07C 2/26 | (2006.01) |
| C10M 107/06 | (2006.01) |
| C10G 50/02 | (2006.01) |
| C10M 107/10 | (2006.01) |
| B01J 31/02 | (2006.01) |

(52) U.S. Cl.
CPC ............ *C10M 107/06* (2013.01); *C10G 50/02* (2013.01); *C10M 107/10* (2013.01); *B01J 31/0284* (2013.01); *B01J 31/0298* (2013.01); *B01J 2231/20* (2013.01); *C10G 2300/1092* (2013.01); *C10G 2400/10* (2013.01); *C10M 2205/0245* (2013.01); *C10M 2205/0285* (2013.01); *C10N 2220/022* (2013.01); *C10N 2230/02* (2013.01)

(58) Field of Classification Search
CPC ............ C07C 2/08; C07C 2/26; C07C 2/22; C07C 11/02; C07C 2531/02; C07C 2531/26; C10G 50/02; C10M 107/06
USPC .................. 585/502, 520, 521, 522, 510, 511
See application file for complete search history.

(56) References Cited

U.S. PATENT DOCUMENTS

| 4,078,010 A * | 3/1978 | Prillieux et al. ............... 585/255 |
| 4,225,739 A * | 9/1980 | Nipe ......................... C07C 2/20 585/525 |
| 4,814,540 A | 3/1989 | Watanabe et al. |
| 4,990,709 A | 2/1991 | Wu |
| 5,304,615 A * | 4/1994 | Ambler et al. ............... 526/189 |
| 6,083,889 A | 7/2000 | Angelo et al. |
| 6,518,473 B2 | 2/2003 | Miller et al. |
| 6,686,511 B2 | 2/2004 | Miller et al. |
| 6,706,936 B2 | 3/2004 | Miller et al. |
| 6,726,857 B2 | 4/2004 | Goedde et al. |
| 6,951,831 B2 | 10/2005 | Lecocq et al. |
| 7,351,780 B2 | 4/2008 | Hope et al. |
| 7,569,740 B2 | 8/2009 | Elomari |
| 7,572,943 B2 | 8/2009 | Elomari et al. |
| 7,572,944 B2 | 8/2009 | Elomari et al. |
| 7,601,879 B2 | 10/2009 | Cross, Jr. et al. |
| 7,732,654 B2 | 6/2010 | Elomari et al. |
| 2004/0030075 A1 | 2/2004 | Hope et al. |
| 2005/0133408 A1 | 6/2005 | Abernathy et al. |
| 2006/0020088 A1* | 1/2006 | Hope et al. ................... 526/72 |
| 2007/0142684 A1 | 6/2007 | Elomari et al. |
| 2007/0142685 A1* | 6/2007 | Elomari ............... C10M 105/04 585/332 |
| 2007/0142691 A1 | 6/2007 | Elomari et al. |
| 2009/0050521 A1 | 2/2009 | Elomari et al. |
| 2009/0182183 A1 | 7/2009 | Keenan et al. |
| 2009/0270666 A1 | 10/2009 | Elomari et al. |
| 2009/0270667 A1 | 10/2009 | Elomari et al. |
| 2011/0004038 A1 | 1/2011 | Elomari et al. |
| 2011/0034742 A1 | 2/2011 | Elomari et al. |
| 2011/0034748 A1 | 2/2011 | Elomari et al. |

FOREIGN PATENT DOCUMENTS

WO  WO 9521872 A1 * 8/1995 ............... C07C 2/54

OTHER PUBLICATIONS

Boon, et al., "Friedel-Crafts Reactions in Ambient-Temperature Molten Salts" in J. Org. Chem., 51(2), 480-483 (1986)—month unknown.*
Bartels, et al., "Lubricants and Lubrication" in Ullmann's Encyclopedia of Industrial Chemistry, pp. 1-35 and 43, Wiley-VCH, 2002—available on-line Jan. 15, 2003.*
Chauvin et al., "Alkylation of isobutane with 2-butane using 1-butyl-3-methylimidazolium chloride-aluminum chloride molten salts as catalysts", Journal of Molecular Catalysis, 1994, 155-165, 92, Elsevier Science BV.
http://www.icis.com/v2/chemicals/9076456/propylene/process.htm, Propylene Production and Manufacturing Process 1.
Chevron Base Oils Analysis, Excel Spreadsheet dated Jul. 22, 2009.

* cited by examiner

*Primary Examiner* — In Suk Bullock
*Assistant Examiner* — Ali Z Fadhel
(74) *Attorney, Agent, or Firm* — Susan M. Abernathy

(57) ABSTRACT

We provide a process for making a base oil, comprising: feeding an olefin feed comprising a propylene to an oligomerization zone comprising an acidic ionic liquid catalyst prepared from an organic-based cation; and tuning an oligomerizing step in the oligomerization zone by mixing a C6+olefin with the propylene in the oligomerization zone to increase a viscosity index of the base oil. We also provide a process for making a base oil, comprising tuning an oligomerizing step by mixing a C6+olefin with a propylene in an oligomerization zone comprising an acidic ionic liquid catalyst prepared from an organic-based cation to increase a viscosity index of the base oil produced in the oligomerization zone; wherein the base oil has selected properties.

19 Claims, No Drawings

US 9,267,091 B2

TUNING AN OLIGOMERIZING STEP THAT USES AN ACIDIC IONIC LIQUID CATALYST TO PRODUCE A BASE OIL WITH SELECTED PROPERTIES

This application is a continuation-in-part to earlier patent applications titled "Tuning an Oligomerization Step to Produce a Base Oil with Selected Properties" (Publication No. US20110034742A1, now U.S. Pat. No. 8,178,739, application Ser. No. 12/538,746, filed on Aug. 10, 2009), "Oligomerization of Propylene to Produce Base Oil Products Using Ionic Liquids-Based Catalysis" (U.S. Pat. No. 8,124,821B2, application Ser. No. 12/538,738 on Aug. 10, 2009), and "Base Oil Composition Comprising Oligomerizerd Olefins" (U.S. Pat. No. 8,101,809B2, application Ser. No. 12/538,752, filed on Aug. 10, 2009); herein incorporated in their entireties. This application is related to a co-filed patent application titled "A BASE OIL HAVING HIGH KINEMATIC VISCOSITY AND LOW POUR POINT", application Ser. No. 13/422,486, now U.S. Pat. No. 8,604,258 filed on Mar. 16, 2012, herein incorporated in its entirety.

FIELD OF THE INVENTION

This invention is directed to processes for making base oils by selecting a kinematic viscosity and tuning an oligomerizing step to produce a base oil with the selected kinematic viscosity.

SUMMARY OF THE INVENTION

We provide a process for making a base oil, comprising:
a. selecting a kinematic viscosity at 100° C.;
b. feeding an olefin feed comprising a propylene to an oligomerization zone comprising an acidic ionic liquid catalyst prepared from an organic-based cation; and
c. tuning an oligomerizing step in the oligomerization zone to produce a base oil having the kinematic viscosity and a viscosity index from 20 to 90.

We also provide a process for making a base oil, comprising:
a. selecting a kinematic viscosity at 100° C. that is greater than 20 mm$^2$/s;
b. feeding an olefin feed comprising a propylene to an oligomerization zone comprising an ionic liquid catalyst prepared from an organic-based cation; and
c. adding a Brönsted acid to the oligomerization zone in an amount needed to produce a base oil having the kinematic viscosity at 100° C. that is greater than 20 mm$^2$/s and a viscosity index less than 100.

We also provide a process for making a base oil, comprising tuning an oligomerizing step in an oligomerization zone comprising a propylene and an acidic ionic liquid catalyst prepared from an organic-based cation to produce a base oil having:
a. a kinematic viscosity at 100° C. greater than 10 mm$^2$/s;
b. a viscosity index from 25 to 90; and
c. a pour point less than −19° C.

DETAILED DESCRIPTION OF THE INVENTION

In the present application the term base oil is used to mean a lubricant component that can be used to produce a finished lubricant.

An olefin feed comprises at least one olefin. An olefin is an unsaturated aliphatic hydrocarbon. Propylene is an unsaturated organic compound having the chemical formula $C_3H_6$. Propylene has one double bond.

The propylene may come from a number of sources, including: as a byproduct from the steam cracking of liquid feedstocks such as propane, butane, gas condensates, naphtha and LPG; from off-gases produced in a FCC unit in a refinery; from propane dehydrogenation using a noble metal catalyst; and by metathesis. Propylene supplies are increasing and there is a demand for upgrading them into higher valued products, such as base oils.

FCC units use a fluidized catalyst system to facilitate catalyst and heat transfer between a reactor and a regenerator. Combustion of coke in the regenerator provides the heat necessary for the reactor. A good overview of examples of FCC units are described in "UOP Fluid Catalytic Cracking (FCC) and Related Processes", UOP 4523-7, June 2008; herein incorporated in its entirety.

New catalysts and octane additives are available that increase propylene production from a FCC unit. One example of an octane additive that increases propylene from a FCC unit is ZSM-5. Additionally metathesis may be combined with steam cracking, or added to a FCC unit, to boost propylene output. Metathesis units need access to large C4 streams that are free of isobutylene and butadiene.

Other processes that are used to improve propylene production are the Arco Chemical Superflex™ process; deep catalytic cracking (DCC) developed by Sinopec; olefins interconversion technology that uses a ZSM-5 zeolite catalyst to convert C4 s, light pygas and light naphtha into propylene and ethylene using a catalyst bed that is either fluidized(MOI) or fixed. Methanol-to-olefins (MTO) processes are flexible enough to allow for propylene production to increase to 45% of total output. Propylene output can be boosted further by integrating an olefin cracking process (OCP) with a MTO process. The OCP process takes the heavier olefins from a MTO unit and converts them into propylene. Propylene is also produced by conversion of methanol to propylene using a MTP process developed by Lurgi and Statoil.

Oligomerizing

Oligomerizing is the combining of two or more organic molecules. The oligomerizing step forms an oligomer. Oligomerizing of two or more olefin molecules in the olefin feed results in the formation of an olefin oligomer that generally comprises a long branched chain molecule with one remaining double bond. The oligomerizing is done using an ionic liquid catalyst in an ionic liquid oligomerization zone. The oligomerization conditions include temperatures between the melting point of the ionic liquid catalyst and its decomposition temperature. In one embodiment, the oligomerization conditions include a temperature of from about 0 to about 150° C., such as from about 0 to about 100° C., or from about 10 to about 100° C., or from about 0 to about 50° C. In one embodiment, the oligomerization zone does not comprise any transition metals from group 8-10.

In one embodiment the oligomerizing is done in the absence of any isoparaffins.

In one embodiment the oligomerizing is done in the presence of one or more longer chain olefins.

Alkylating

The oligomer is optionally alkylated in the presence of an isoparaffin. The isoparaffin is a branched-chain version of a straight-chain (normal) saturated hydrocarbon. Examples of isoparaffins are isobutane, isopentane, isohexane, isoheptane, and other higher isoparaffins. Economics and availability can be the main drivers of the isoparaffin selection. Lighter isoparaffins tend to be less expensive and more available due to their low gasoline blend value (due to their relatively high vapor pressure). Mixtures of isoparaffins can also be used. Mixtures such as $C_4$-$C_5$ isoparaffins can be used and may be advantaged because of reduced separation costs. The isoparaffin may also comprise diluents such as normal paraffins. This can be a cost savings, by reducing the cost of separating isoparaffins from close boiling paraffins. Normal paraffins will tend to be unreactive diluents in the alkylating step. The isoparaffin may also be mixed with a pentene.

The alkylating is done using an ionic liquid catalyst in an ionic liquid alkylation zone. The set of alkylation conditions are selected to form an alkylated oligomeric product. The alkylation conditions include temperatures between the melting point of the ionic liquid catalyst and its decomposition temperature. In one embodiment the alkylation conditions include a temperature of from about 15 to about 200° C., such as from about 20 to about 150° C., from about 25 to about 100, or from about 50 to 100° C.

In one embodiment, a Brönsted acid such as HCl, a metal halide, an alkyl halide, or another component or mixture of components that directly or indirectly supplies protons is added to either or both the oligomerization zone or the alkylation zone. Although not wishing to be limited by theory it is believed that the presence of a Brönsted acid such as HCl or other components that supplies protons greatly enhances the acidity and, thus, the activity of the ionic liquid catalyst.

Base Oil

The selected kinematic viscosity at 100° C. can be a specific value, in $mm^2/s$, with a tolerance range such as plus or minus 0.05 or plus or minus 0.1, or in another embodiment it can be a viscosity grade. Examples of different viscosity grades of base oil are XXLN, XLN, LN, MN, and HN. An XXLN grade of base oil, when referred to in this disclosure, is a base oil having a kinematic viscosity at 100° C. between about 1.5 $mm^2/s$ and about 2.3 $mm^2/s$. An XLN grade of base oil is a base oil having a kinematic viscosity at 100° C. between about 2.3 $mm^2/s$ and about 3.5 $mm^2/s$. A LN grade of base oil is a base oil having a kinematic viscosity at 100° C. between about 3.5 $mm^2/s$ and about 5.5 $mm^2/s$. A MN grade of base oil is a base oil having a kinematic viscosity at 100° C. between about 5.5 $mm^2/s$ and about 10.0 $mm^2/s$. A HN grade of base oil is a base oil having a kinematic viscosity at 100° C. above 10 $mm^2/s$. Generally, the kinematic viscosity of a HN grade of base at 100° C. will be between about 10.0 $mm^2/s$ and about 30.0 $mm^2/s$. In one embodiment the selected kinematic viscosity at 100° C. is greater than 20 $mm^2/s$.

The kinematic viscosity of the base oil can range from about 1.5 $mm^2/s$ to about 70 $mm^2/s$ at 100° C. In some embodiments, the base oil has a kinematic viscosity at 100° C. of 2.9 $mm^2/s$ or greater, of 3 $mm^2/s$ or greater, of 8 $mm^2/s$ or greater, or of 10 $mm^2/s$ or greater.

Kinematic viscosity is determined by ASTM D 445-06, Cloud Point is determined by ASTM D 2500-09. Viscosity index is determined by ASTM D 2270-04. Pour Point is determined by ASTM D 5950-02, (Reapproved 2007). ASTM test methods D 445-06, D 2500-09, D 2270-04, and D 5950-02 are incorporated by reference herein in their entirety.

The viscosity index of the base oil is generally less than 120. In some embodiments the viscosity index is less than 100, for example from 25 to 90, or from 35 to 80. In other embodiments the viscosity index is from 50 to 90, or from greater than 50 to 85. In some embodiments a value for the viscosity index is selected. The value for the viscosity index may be a be a specific whole number value with a tolerance range such as plus or minus 1, plus or minus 2, plus or minus 3, or plus or minus 5.

The base oil is recovered from either the oligomer product from the oligomerizing step, from the alkylated oligomeric product from the alkylating step or from the products of both the oligomerizing and alkylating steps. The base oil is easily recovered from an ionic liquid catalyst phase by decanting.

In one embodiment, when the base oil has a low viscosity at a high temperature (i.e., low viscosity index) the base oil is especially suitable for blending into a transformer oil. The transformer oil is made by blending in one or more additives into the base oil. A base oil with a lower viscosity index helps the transformer oil blended with it to absorb the heat from transformer components such as windings, and bring the heat away faster. In the past naphthenic base oils with a viscosity index of about 45 or less had to be used in transformer oils for effective heat removal. Transformer operating temperatures can reach up to 80° C., up to 140° C., or even higher, and the transformer oils made from the base oil work well under these high operating temperatures.

The base oil has a low cloud point. In some embodiments the cloud point can be less than −25° C., less than −40° C., less than −45° C., less than −50° C., less than −55° C., or even less than −60° C. The base oil also has a low pour point, generally less than −10° C. In some embodiments the pour point can be from −20° C. to −50° C.

In some embodiments the base oil is a bright stock. Bright stock is named for the SUS viscosity of the base oil at 210° F., and bright stock has a kinematic viscosity above 180 $mm^2/s$ at 40° C., such as above 250, $mm^2/s$ at 40° C., or possibly ranging from 500 to 1100 $mm^2/s$ at 40° C.

In one embodiment the base oil has a broad boiling range. The boiling range of the base oils is generated by simulated distillation using SIMDIST. SIMDIST involves the use of ASTM D 6352-04, or ASTM D 2887-08, as appropriate. ASTM D 6352-04 and ASTM D 2887-08 are incorporated herein by reference in their entirety.

A broad boiling range is a difference between the T90 and T10 boiling points of at least 225° F. by SIMDIST. In some embodiments the base oil has a difference between the T90 and T10 boiling points of at least 225° F., 250° F., 275° F., or 300° F. Because of the broad boiling range, the base oil may comprise two or more viscosity grades of base oil. A viscosity grade of base oil is base oil that differs from another viscosity grade of base oil by having a difference in kinematic viscosity at 100° C. of at least 0.5 $mm^2/s$. The different viscosity grades of base oil in the base oil recovered from one or both of the oligomerizing or alkylating steps may be separated by vacuum distillation. One of the different viscosity grades of base oil may be a distillate bottoms product.

In one embodiment the base oil comprises a significant wt % of hydrocarbons boiling at 900° F. or higher. The level can be greater than 25 wt %, greater than 35 wt %, or from 45 to 70 wt %. Higher levels of hydrocarbons boiling at 900° F. or higher are desired, as there are increasingly limited amounts of base oils with these properties, especially as Group I base oil plants are being shut down.

Tuning the Process

Sometimes there is an increased demand for one or more base oils having a selected kinematic viscosity. In one embodiment the set of alkylating conditions or oligomerizing conditions are tuned to optimize a yield of the base oil having a selected kinematic viscosity or a selected viscosity index. For example, by additionally including mixing one or more longer chain alpha olefins with the olefin feed, the viscosity index of the base oil is increased. A longer chain alpha olefin feed comprises C6+ olefins. For example, the longer chain alpha olefin can comprise a C6, a C7, a C8, a C9, a C10, a C11, a C12 or an even higher carbon number alpha olefin, or mixtures thereof. In one embodiment the one or more longer chain alpha olefins comprise a C6 to a C20 alpha olefin, a C6 to a C12 alpha olefin, or a mixture thereof.

In some embodiments, the higher the carbon number of the longer chain alpha olefin that is mixed with the olefin feed comprising a propylene, the higher the viscosity index of the base oil produced at the same degree of incorporation of the longer chain alpha olefin into the oligomer product. In some embodiments, the higher the carbon number of the longer chain alpha olefin that is mixed with the olefin feed comprising a propylene, the lower the kinematic at 100° C. of the base oil produced at the same degree of incorporation of the longer chain alpha olefin into the oligomer product.

Raising the temperature during the oligomerizing, in some embodiments, can produce a higher viscosity base oil. The tuning can be done by one or more of the following: changing a composition of the olefin feed, adding an additional olefin to the olefin feed, adding a component that supplies protons to the oligomerization zone, adjusting a temperature in the oligomerization zone, or including one or more longer chain alpha olefins with the olefin feed.

In some embodiments, the set of oligomerizing conditions or set of alkylating conditions are tuned to optimize a yield of one of two or more viscosity grades of base oil. For example the ratio of an isoparaffin to an olefin can be adjusted up to favor more alkylation and less oligomerization, such that a yield of a lighter viscosity grade of base oil is increased. Alternatively, the amount of a Brönsted acid or other proton source in either the oligomerization zone or an alkylation zone may be adjusted up or down to optimize a yield of a base oil having a selected kinematic viscosity. In one embodiment, the tuning includes adjusting a length of time for an oligomerization reaction in the oligomerization zone. Under some conditions, the longer the oligomerization reaction continues, the higher the kinematic viscosity of the base oil that is produced.

In one embodiment, the oligomerization zone additionally comprises an alkylation zone. In this embodiment, the alkylation reaction can be tuned to produce the selected kinematic viscosity or viscosity index. The alkylating optionally can occur under effectively the same conditions as the oligomerizing. This finding that alkylation and oligomerization reactions can occur using effectively the same ionic liquid catalyst system and optionally under similar or even the same conditions can be used to make a highly integrated, synergistic process resulting in a base oil with desired properties. Also in a particular embodiment the alkylating and oligomerizing can occur simultaneously under the same conditions.

In one embodiment the ionic liquid oligomerization zone, or the ionic liquid alkylation zone, comprises an acidic chloroaluminate ionic liquid catalyst.

In some embodiments both the ionic liquid oligomerization and the ionic liquid alkylation zones comprise an acidic chloroaluminate ionic liquid catalyst. In some embodiments, the same acidic chloroaluminate ionic liquid catalyst is used in both zones.

The oligomerizing and the alkylating can be performed concurrently or separately. An advantage of combining the oligomerizing and alkylating is lower capital and operating costs. An advantage of a 2 step process (oligomerizing followed by alkylating in a separate zone) is that the two separate reaction zones can be optimized independently. Thus the oligomerization conditions can be different than the alkylation conditions. Also the ionic liquid catalyst can be different in the different zones. For instance, it may be preferable to make the alkylation zone more acidic than the oligomerization zone. This may involve the use of an entirely different ionic liquid catalyst in the two zones or one of the zones can be modified, for example, by the addition of a Brönsted acid to the alkylation zone.

In one embodiment, the ionic liquid catalysts used in the ionic liquid alkylation zone and in the ionic liquid oligomerization zone are the same. This helps save on catalyst costs, potential contamination issues, and provides synergy opportunities in the process.

Ionic Liquid Catalyst

"Ionic liquids" are liquids whose make-up is comprised of ions as a combination of cations and anions. Ionic liquids are a class of compounds made up entirely of ions and are generally liquids at ambient and near ambient temperatures. Ionic liquids tend to be liquids over a very wide temperature range, with some having a liquid range of up to 300° C. or higher. Ionic liquids are generally non-volatile, with effectively no vapor pressure. Many are air and water stable, and can be good solvents for a wide variety of inorganic, organic, and polymeric materials.

The ionic liquids used herein are different from Lewis acids, such as $AlCl_3$ or $BF_3$, which are polar covalent molecules. Ionic liquids are also different from metallocene-based catalysts which are made from metal cations and a co-catalyst, such as alkyl substituted cyclopendienyl compounds of zirconium or hafnium and a condensation product of organoaluminum compounds and water. Metallocene-based catalysts may be ionic, but they are not ionic liquids prepared from organic-based cations.

The most common ionic liquids are those prepared from organic-based cations and inorganic or organic anions. The properties of ionic liquids can be tailored by varying the cation and anion pairing. Ionic liquids and some of their commercial applications are described, for example, in J. Chem. Tech. Biotechnol, 68:351-356(1997); J. Phys. Condensed Matter, 5: (supp 346):699-B106 (1993); Chemical and Engineering News, Mar. 30, 1998, 32-37; J. Mater. Chem., *:2627-2636(1998); and Chem. Rev., 99:2071-2084 (1999), the contents of which are hereby incorporated by reference.

Many ionic liquids are amine-based. Among the most common ionic liquids are those formed by reacting a nitrogen-containing heterocyclic ring (cyclic amines), or nitrogen-containing aromatic rings (aromatic amines), with an alkylating agent (for example, an alkyl halide) to form a quaternary ammonium salt, followed by ion exchange with Lewis acids or halide salts, or by anionic metathesis reactions with the appropriate anion sources to introduce the desired counter anion to form ionic liquids.

Examples of suitable heteroaromatic rings include pyridine and its derivatives, imidazole and its derivatives, and pyrrole and its derivatives. These rings can be alkylated with varying alkylating agents to incorporate a broad range of alkyl groups on the nitrogen including straight, branched or cyclic $C_{1-20}$ alkyl group, but preferably $C_{1-12}$ alkyl groups since alkyl groups larger than $C_1$-$C_{12}$ may produce undesirable solid products rather than ionic liquids. Pyridinium and imidazolium-based ionic liquids are perhaps the most commonly used ionic liquids. Other amine-based ionic liquids including cyclic and non-cyclic quaternary ammonium salts are frequently used. Phosphonium and sulphonium-based ionic liquid catalysts have also been used.

Anions which have been used in ionic liquids include chloroaluminate, bromoaluminate, gallium chloride, tetrafluoroborate, tetrachloroborate, hexafluorophosphate, nitrate, trifluoromethane sulfonate, methylsulfonate, p-toluenesulfonate, hexafluoroantimonate, hexafluoroarsenate, tetrachloroaluminate, tetrabromoaluminate, perchlorate, hydroxide anion, copper dichloride anion, iron trichloride anion, antimony hexafluoride, copper dichloride anion, zinc trichloride anion, as well as various lanthanum, potassium, lithium, nickel, cobalt, manganese, and other metal ions.

The presence of the anion component of the ionic liquid catalyst should give the ionic liquid a Lewis or Franklin acidic character. Generally, the greater the mole ratio of the anion component to the cation component, the greater is the acidity of the ionic liquid mixture.

In some embodiments, the ionic liquid catalysts are acidic haloaluminates, such as acidic chloroaluminate ionic liquid catalysts. To be effective at alkylation the ionic liquid catalyst is acidic.

In one embodiment the ionic liquid catalyst is a quaternary ammonium chloroaluminate ionic liquid having the general formula RR' R" N H$^+$ Al$_2$Cl$_7^-$, wherein RR' and R" are alkyl groups containing 1 to 12 carbons. Examples of quaternary ammonium chloroaluminate ionic liquid salts are an N-alkyl-pyridinium chloroaluminate, an N-alkyl-alkylpyridinium chloroaluminate, a pyridinium hydrogen chloroaluminate, an alkyl pyridinium hydrogen chloroaluminate, a 1-butyl-pyridinium chloroaluminate, a di-alkyl-imidazolium chloroaluminate, a tetra-alkyl-ammonium chloroaluminate, a tri-alkyl-ammonium hydrogen chloroaluminate, or a mixture thereof.

In one embodiment, the acidic chloroaluminate ionic liquid catalyst is an acidic pyridinium chloroaluminate. Examples are alkyl-pyridinium chloroaluminates. In one embodiment, the acidic chloroaluminate ionic liquid catalyst is an alkyl-pyridinium chloroaluminate having a single linear alkyl group of 2 to 6 carbon atoms in length. One particular acidic chloroaluminate ionic liquid catalyst that has proven effective is 1-butyl-pyridinium chloroaluminate.

For example, a typical reaction mixture to prepare n-butyl pyridinium chloroaluminate ionic liquid salt is shown below:

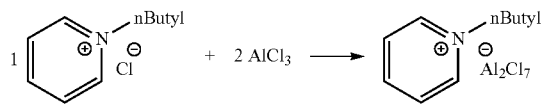

In an optional embodiment the base oil can be hydrogenated to decrease the concentration of olefins in the base oil and thus reduce the Bromine Number. After hydrogenation, the base oil has a Bromine Number of less than 0.8, for example less than 0.5, less than 0.3, or less than 0.2.

Transformer Oil Additives

The base oils described herein, are blended with one or more additives to provide a transformer oil. When used, the one or more additives are present in an effective amount. The effective amount of additives or additives used in the transformer oil is that amount that imparts the desired property or properties. It is undesirable to include an amount of additives in excess of the effective amount. The effective amount of additives is relatively small, generally less than 1.5 weight % of the transformer oil, preferably less than 1.0 weight %, as the transformer oils are very responsive to small amounts of additives.

The additives that may be used with transformer oils comprise pour point depressants, antioxidants, and metal deactivators (also known as metal passivators when they deactivate copper). A review of the different classes of lubricant base oil additives may be found in "Lubricants and Lubrication", edited by Theo Mang and Wilfried Dresel, pp. 85-114.

Pour point depressants lower the pour point of oils by reducing the tendency of wax, suspended in the oils, to form crystals or a solid mass in the oils, thus preventing flow. Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants are disclosed in U.S. Pat. Nos. 4,880,553 and 4,753,745, which are incorporated herein by reference. The amount of pour point depressants added is preferably between about 0.01 to about 1.0 weight percent of the transformer oil.

Excellent oxidation stability is an important property for transformer oil. Transformer oils without sufficient oxidation stability are oxidized under the influence of excessive temperature and oxygen, particularly in the presence of small metal particles, which act as catalysts. With time, the oxidation of the oil can result in sludge and deposits. In the worst case scenario, the oil canals in the equipment become blocked and the equipment overheats, which further exacerbates oil oxidation. Oil oxidation may produce charged by-products, such as acids and hydroperoxides, which tend to reduce the insulating properties of the transformer oil. The transformer oils described herein generally have excellent oxidation stability without the addition of antioxidant. However, when additional oxidation stability is desired, antioxidants may be added. Examples of antioxidants useful in the present invention are phenolics, aromatic amines, compounds containing sulfur and phosphorus, organosulfur compounds, organophosphorus compounds, and mixtures thereof. The amount of antioxidants added is preferably between about 0.001 to about 0.3 weight % of the transformer oil of the present invention.

Metal deactivators that passivate copper in combination with antioxidants show strong synergistic effects as they prevent the formation of copper ions, suppressing their behavior as pro-oxidants. Metal deactivators useful in transformer oils comprise triazoles, benzotriazoles, tolyltriazoles, and tolyltriazole derivatives. The amount of metal deactivators added is preferably between about 0.005 to about 0.8 weight % of the transformer oil.

An example of an additive system that may be useful in transformer oil is disclosed in U.S. Pat. No. 6,083,889, incorporated herein by reference.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims.

EXAMPLES

Preparation of N-Butyl-Pyridinium Chloroaluminate Ionic Liquid

N-butyl-pyridinium chloroaluminate is a room temperature ionic liquid prepared by mixing neat N-butyl-pyridinium chloride (a solid) with neat aluminum trichloride (also a solid) in an inert atmosphere. The synthesis of butylpyridinium chloride and the corresponding N-butyl-pyridinium chloroaluminate are described as follows. In a 2-L Teflon-lined autoclave, 400 gm (5.05 Mol.) anhydrous pyridine (99.9% pure purchased from Aldrich) were mixed with 650 gm (7mol.) 1-chlorobutane (99.5% pure purchased from Aldrich). The neat mixture was sealed and stirred at 145° C. under autogenic pressure overnight. Then, the autoclave was cooled down to room temperature, vented and the resultant mixture was transferred to a 3-L round bottom flask. Chloroform was used to rinse the liner in the autoclave and dissolve the stubborn crusty product that adhered to the sides of the liner. Once all the mixture was transferred to the 3-L flask, the mixture was concentrated at reduced pressure on a rotary evaporator (in a hot water bath) to remove excess chloride, unreacted pyridine and the chloroform rinse. A tan solid product was obtained and further purified by dissolving in hot acetone and precipitating the pure product through cooling and addition of diethyl ether. Filtering and drying under vacuum and heat on a rotary evaporator gave 750 g (88% yields) of the desired product as off-white shiny solid. 1H-NMR and 13C-NMR analyses confirmed that the desired N-butyl-pyridinium chloride with no impurities detectable by NMR analysis was produced.

N-butylpyridinium heptachloroaluminate ionic liquid was prepared from an organic-based cation by slowly mixing the dried N-butylpyridinium chloride with anhydrous aluminum chloride ($AlCl_3$) according to the following procedure. The N-butylpyridinium chloride (as described above) was dried under vacuum at 80° C. for 48 hours to get rid of residual water (N-butylpyridinium chloride is hydroscopic and readily absorbs water from exposure to air). Five hundred grams (2.91 mol.) of the dried N-butylpyridinium chloride were transferred to a 2-L beaker in a nitrogen atmosphere in a glove box. The, 777.4 gm (5.83 mol.) of anhydrous powdered AlCl3(99.99% pure from Aldrich) was added in small portions, while stirring, to control the temperature of the highly exothermic reaction. Once all the AlCl3 was added, the resulting amber-looking liquid was left to gently stir overnight in the glove box. The liquid was then filtered to remove any un-dissolved $AlCl_3$. The resulting acidic N-butylpyridinium heptachloroaluminate ionic liquid was used as the catalyst for later alkylations.

Example 1

Oligomerization of Pure Propylene

A 300 cc autoclave was charged with 20 gm of ionic liquid catalyst (n-butylpyridinium heptachloroaluminate) and 20 gm n-hexane (as diluent) under nitrogen in a glove box. The autoclave was sealed and removed from the glove box and cooled in a dry ice bath and affixed to a propylene tank (>99% commercial grade) via an inlet that allows the flow of propylene into the reactor where 100 gm of propylene was transferred to the reactor (autoclave). The reactor was affixed to an overhead stirrer. The reaction temperature was controlled by a thermocouple connected to a temperature control apparatus. Once everything was in place, the reaction began by slowly stirring the charge in the reactor at 0° C. in a batch-style operation. The reaction was exothermic and the rise in temperature was quick and sudden. The rise in temperature was controlled by immersing the autoclave in an ice bath. The reaction temperature was kept at around 50° C. The pressure of the reaction began very high and decreased as the propylene was oligomerized. The reaction was allowed to proceed for 15-30 minutes. The reaction, then, was stopped and the reactor was allowed to cool to room temperature. The reaction was worked up by simply decanting off the organic layer (the products). The remaining ionic liquid phase was washed with hexane to remove all residual organics from the ionic liquid phase, and the wash was added to the original decant. The organic layer was then washed thoroughly with water and dried over anhydrous $MgSO_4$ and then filtered. The filtrate was concentrated on a rotary evaporator to remove hexane (used as solvent to extract oligomers from the catalyst). The heavy viscous colorless oil was then analyzed for boiling range, viscosity index, kinematic viscosity at 100° C. and 40° C., pour point and cloud point. The products were analyzed for their boiling range by simulated distillation analysis. The reaction yields and propylene conversions varied depending on the duration of the run. The oligomers yielded ranges from 60→90 wt % depending on the length of the reaction. Table 1 summarizes the properties of propylene oligomerization products with pure propylene and in the presence of other olefins.

Example 2

Oligomerization of Refinery Propylene

Using the procedure described above, refinery propylene feed containing 77% propylene and 23% propane was oligomerized according to the procedure of example 1. The products and selectivity were identical for the oligomerization of the pure propylene where viscosity index, viscosity, and low temperature properties (cloud point and pour point) were very similar. The product properties are given in Table 1. There was no indication that the presence of propane caused any problems for the oligomerization reaction.

Example 3

Oligomerization of Propylene in the Presence of 1-hexene

Using the procedure described in example 1, propylene (90 gm) was oligomerized in the presence of 1-hexene (12 gm). Once the autoclave was charged with the catalyst, it was cooled to −30° C. (dry ice bath) and 1-hexene was added to minimize oligomerization of 1-hexene before the addition of propylene. Then propylene was also added at this low temperature and the dry ice bath was removed. The reaction was allowed to proceed as described in example 1. The reaction afforded 72 gm of oligomers. See Table 1 for the properties of the oligomers.

Example 4

Oligomerization of Propylene in the Presence of 1-octene

Using the procedure described in example 3, propylene (90 gm) was in the presence of 1-octene (15 gm). The reaction yielded 75 gm of oligomers. The properties of the oil are shown in Table 1.

Example 5

Oligomerization of Propylene in the Presence of 1-decene

Using the procedure described in example 3, propylene (90 gm) was oligomerized in the presence of 1-decene (20 gm). The reaction yielded 78 gm of oligomers. The properties of the oil are shown in Table 1.

Example 6

Oligomerization of Propylene in the Presence of 1-dodecene

Using the procedure described in example 3, propylene (80 gm) was oligomerized in the presence of 1-dodecene (20 gm). The reaction yielded 66 gm of oligomers. The properties of the oil are shown in Table 1.

Example 7

Oligomerization of Propylene in the Presence of C6-C12 Olefinic Mixture

Using the procedure described in example 3, propylene (90 gm) was oligomerized in the presence of 1-hexene (1.5 gm), 1-octene (2 gm), 1-decene (2.5 gm), and 1-dodecene (3 gm). The reaction yielded 64 gm of oligomers. The properties of the oil are shown in Table 1.

TABLE 1

| | VI | Pour Point, °C. | Cloud Point, °C. | KVis$_{40\ C.}$ | KVis$_{100\ C.}$ | Boiling Range, °F. | 900° F.+ Wt % |
|---|---|---|---|---|---|---|---|
| Pure Propylene | 50 | −19 | <−60 | 268 | 17 | 390-1300 | 55 |
| Propylene/C3 (77:23) | 48 | −21 | <−60 | 297 | 18 | 450-1330 | 60 |
| Propylene/C6$^=$-C$^{12}$ | 55 | −20 | <−60 | 290 | 18 | 457-1330 | 59 |
| Propylene/C6$^=$ | 55 | −24 | <−60 | 245 | 16 | 460-1315 | 57 |
| Propylene/C8$^=$ | 65 | −27 | <−60 | 177 | 14 | 458-1354 | 55 |
| Propylene/C10$^=$ | 70 | −31 | <−60 | 169 | 14 | 420-1291 | 62 |
| Propylene/C12$^=$ | 78 | −31 | <−60 | 153 | 13 | 420-1260 | 62 |

These results demonstrate that the addition of longer chain alpha olefins can tune the oligomerization step to provide a base oil with a higher viscosity index. In some embodiments the increase in the carbon number of the longer chain alpha olefin can increase the viscosity index but maintain essentially the same kinematic viscosity (see Propylene/C8$^=$ and Propylene/C10$^=$).

Example 8

Oligomerization of Propylene

Oligomerization of propylene in the absence of isoparaffins or iso-olefins, was done by mixing the propylene with a 1-Butyl-pyridinium chloroaluminate ionic liquid catalyst and a small amount of HCl as a promoter. By adding a component that supplied protons, HCl, a base oil with a higher kinematic viscosity was produced. The amount of Brönsted acid needed for the reaction was very small, and can be in catalytic amounts ranging from 0.1 gram

| Unfractionated oligomers | 680° F.− Fraction | 680-800° F. Fraction | 801-900° F. Fraction | 900° F.+ Fraction |
|---|---|---|---|---| to 1 gm. The presence of ppm levels of water in the feed was sufficient to produce the required amounts of protons.

A bright stock oil with the properties summarized in Table 2 was produced.

TABLE 2

| | |
|---|---|
| Kinematic Viscosity at 40° C., mm$^2$/s | 572 |
| Kinematic Viscosity at 100° C., mm$^2$/s | 25 |
| Viscosity Index | 36 |
| Pour Point, °C. | −25 |
| Cloud Point, °C. | <−60 |

Example 9

Oligomerization of Propylene and Fractionation of Product

In this example, propylene was oligomerized in ionic liquids without introducing any alpha olefins. The procedure used was the same as described in example 1. Table 3 describes the properties of the oligomers made in this example, before and after fractionation.

TABLE 3

| Yields | >96% | 16% | 14% | 15% | 53-61% |
|---|---|---|---|---|---|
| Viscosity Index | 31-48 | — | 49 | 42 | 47 |
| KVis @ 40° C. | 270 | 3.8 | 49 | 109 | 3087 |
| KVis @100° C. | 18-20 | 1.4 | 6 | 10 | 67 |
| Cloud Point, °C. | −60 | <−60 | <−60 | −60 | <−60 |
| Pour Point, °C. | −19 | <−60 | −41 | −29 | 1 |

Example 10

Oligomerization of Propylene (With and Without Addition of C$_{10}$-C$_{12}$ Alpha Olefins) and Fractionation of Product This example was run according to example 1, with the exception of 1-decene and 1-dodecene were added at two different concentrations to examine the effect of long chain alpha olefins on the properties of the oligomerized products, compared to oligomer products made with only propylene. The oligomerized products were fractionated. Table 4 shows the properties of the oligomers of this example, including the propylene oligomers compared to oligomers of propylene co-fed with 1-decene and 1-dodecene at 20 wt % and 28 wt % of a 1:1 mixture of the two long chain alpha olefins.

TABLE 4

| Oligomers | $C_3^=$ Oligomers 900° F.+ | $C_3^=$ + 20 wt % $C_{10}$-$C_{12}$ Olefins | | $C_3^=$ + 28 wt % $C_{10}$-$C_{12}$ Olefins | |
|---|---|---|---|---|---|
| | | 900° F.− | 900° F.+ | 900° F.− | 900° F.+ |
| Yields | 55% | 40% | 60% | ~40% | ~60% |
| Viscosity Index | 47 | 75 | 74 | 81 | 80 |
| KVis @ 40° C. | 3087 | 22 | 1003 | 25 | 711 |
| KVis @ 100° C. | 67 | 4 | 42 | 4.5 | 36 |
| Cloud Point, ° C. | <−60 | <−60 | −60 | <−60 | <−60 |
| Pour Point, ° C. | 1 | −56 | −14 | −52 | −16 |

This example demonstrates how the addition of C10 and C12 alpha olefins during the oligomerization of propylene significantly improved the viscosity index and pour points of the oligomerized products.

What is claimed is:

1. A process for making a base oil, comprising:
   a. feeding an olefin feed comprising a propylene to an oligomerization zone comprising an acidic ionic liquid catalyst prepared from an organic-based cation; and
   b. tuning an oligomerizing step in the oligomerization zone by mixing 20 to 28 wt % of one or more C6-C12 alpha olefin with the propylene in the oligomerization zone to increase a viscosity index of the base oil; wherein the viscosity index is from 50 to 90.

2. The process of claim 1, wherein the base oil has a kinematic viscosity at 100° C. that is 2.9 mm²/s or greater.

3. The process of claim 1, wherein the viscosity index is less than 85.

4. The process of claim 1, wherein the oligomerization zone additionally comprises an alkylation zone.

5. The process of claim 1, additionally including tuning an alkylation reaction in the oligomerization zone to produce the viscosity index and a kinematic viscosity of the base oil.

6. The process of claim 1, additionally comprising blending the base oil with one or more additives to make a transformer oil.

7. The process of claim 1, wherein the acidic ionic liquid catalyst is selected from the group of an amine-based catalyst, a phosphonium-based catalyst, a sulphonium-based catalyst, and mixtures thereof.

8. The process of claim 7, wherein the amine-based catalyst is a quaternary ammonium chloroaluminate ionic liquid salt.

9. The process of claim 1, wherein the base oil is a bright stock.

10. The process of claim 1, wherein the base oil has at least 55 wt % boiling at 482° C. (900° F.) or higher.

11. The process of claim 1, wherein the tuning decreases a kinematic viscosity at 100° C. of the base oil.

12. The process of claim 1, wherein the C6 to the C12 alpha olefin comprises the C6 to a C8 alpha olefin.

13. The process of claim 2, wherein the kinematic viscosity at 100° C. of the base oil is from greater than 20 to 70 mm²/s.

14. The process of claim 1, wherein the tuning increases the viscosity index without increasing a kinematic viscosity at 100° C. of the base oil.

15. A process for making a base oil, comprising tuning an oligomerizing step by mixing 20 to 28 wt % of one or more C6-C12 alpha olefin with a propylene in an oligomerization zone comprising an acidic ionic liquid catalyst prepared from an organic-based cation to increase a viscosity index of the base oil produced in the oligomerization zone; wherein the base oil has:
   a. the kinematic viscosity at 100° C. greater than 10 mm²/s;
   b. the viscosity index from greater than 50 to 90; and
   c. a pour point less than −19° C.

16. The process of claim 15, wherein the tuning decreases a kinematic viscosity at 100° C. of the base oil.

17. The process of claim 15, wherein the pour point is from −20° C. to −50° C.

18. The process of claim 15, wherein the base oil has at least 55 wt % boiling at 482° C. (900° F.) or higher.

19. The process of claim 15, wherein the tuning increases the viscosity index without increasing a kinematic viscosity at 100° C. of the base oil.

* * * * *